May 15, 1934.  T. N. KELLETT  1,958,854

ORIFICE METER DISK HOUSING CONSTRUCTION

Filed May 16, 1931  2 Sheets-Sheet 1

Inventor
Thomas N. Kellett
By Lyon & Lyon
Attorneys

May 15, 1934.   T. N. KELLETT   1,958,854
ORIFICE METER DISK HOUSING CONSTRUCTION
Filed May 16, 1931   2 Sheets-Sheet 2

Inventor
Thomas N. Kellett
By Lyon & Lyon
Attorneys

Patented May 15, 1934

1,958,854

UNITED STATES PATENT OFFICE 1,958,854

ORIFICE METER DISK HOUSING CONSTRUCTION

Thomas N. Kellett, Los Angeles, Calif.

Application May 16, 1931, Serial No. 537,784

6 Claims. (Cl. 137—75)

This invention relates to an orifice meter construction and relates particularly to the construction of an orifice meter disk housing which is permanently attached between flanges of a pipe carrying a fluid or liquid of any kind to be measured.

An orifice meter disk housing has been employed heretofore having a body resembling a pipe valve having an upward extension through which the orifice meter disk is passed down into alignment with the opening through the housing. Within the housing, a clamping ring was provided having a thread connection with a sleeve within the housing, and within the housing means was provided for rotating this collar or clamping ring from the exterior to clamp the disk against its seat.

The general object of this invention is to improve and simplify the construction of housings of this type and to provide a construction whereby the disk can very readily be put in place and clamped up tight to prevent leakage of the fluid or liquid around its edge; also to construct the parts in such a way that the form of clamping collar is greatly simplified, enabling the housing to be made of simple block form, thereby reducing its weight and rendering it less expensive to construct.

It has also been the practice to clamp an orifice disk directly between pipe flanges but this necessitates hacking the flanges away to remove the disk, and involves considerable labor. One of the objects of my invention is to provide a construction which will simplify the operations of removing the orifice disk and avoid the necessity for disconnecting any flange bolts in the pipe line.

A further object of the invention also is to provide a simple construction for the housing which will enable it to be readily removed or replaced in a pipe line.

Further objects of the invention will appear hereinafter.

The invention consists in the novel parts and combinations of parts to be described hereinafter, all of which contribute to produce an efficient orifice meter disk housing construction.

A preferred embodiment of the invention is described in the following specification, while the broad scope of the invention is pointed out in the appended claims.

Figure 5:
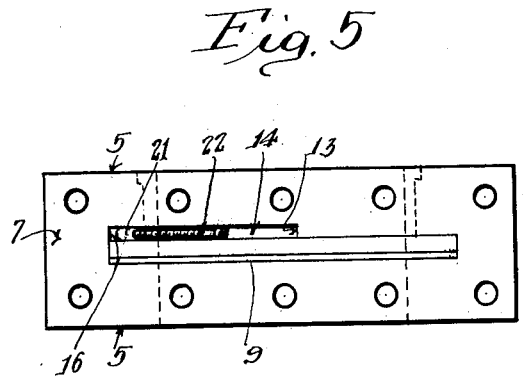
Figure 5 is a plan of the housing with the cover removed.
Figure 2:
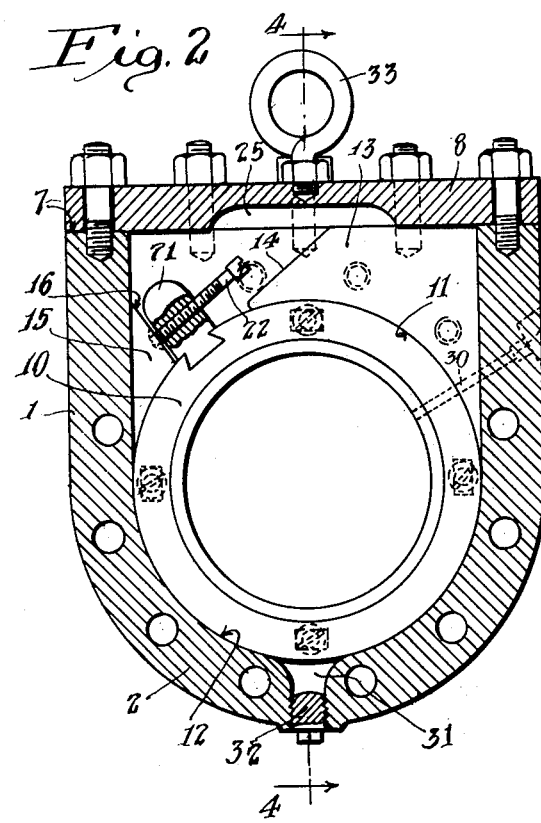
Figure 2 is a section taken about on the line 2—2 of Figure 4 upon an enlarged scale and particularly illustrating the inner construction of the housing, and also illustrating the means employed for clamping up the disk on its seat.

Referring more particularly to the parts, 1 indicates the body of the housing which has substantially the form of a block with a rounded lower face 2 struck on a radius corresponding to the radius of the flanges 3 of the pipe ends 4 that are connected by the housing. In other words, the body 1 presents two true side faces 5 against which the flanges 3 are secured by circumferentially placed bolts 6. The housing 2 has an opening 5ª through it, which is of the same diameter as the inside diameter of the connected pipes. The upper side of the housing 1 presents a flat cover seat 7 to receive the removable cover 8 of the housing, which can be bolted in place as indicated. Passing down from this upper face 7 the housing is provided with a chamber in the form of a relatively narrow slot 9 (see Fig. 5). This slot 9 has a length somewhat greater than the outside diameter of the pipe and is sufficiently long to enable a presser ring 10 to be passed down the slot and then laterally to come into a recess 11 formed in the side face of the slot, with the lower edge of the ring resting on a rounded inner face 12 at the bottom of the body. The same side face of the slot 9 that receives the ring 10 is provided with a lateral abutment 13 (see Figs. 2 and 5), which abutment terminates at the left in an inclined shoulder 14 (see Fig. 2), and a similar abutment 15 is provided projecting the same way and located on the opposite side of the vertical plane passing through the axis of the pipes and the housing. This lateral abutment 15 presents an inclined edge or shoulder 16. Means is provided for effecting a slight rotation of the ring 10, and I utilize this rotation to clamp the orifice disk 17 in place against a fixed seat 18. If desired, the fixed seat 18 may simply be a face formed in the casting that constitutes the body 1, but, if desired, I may provide a bushing 19 in the body having this face.

Figure 3:
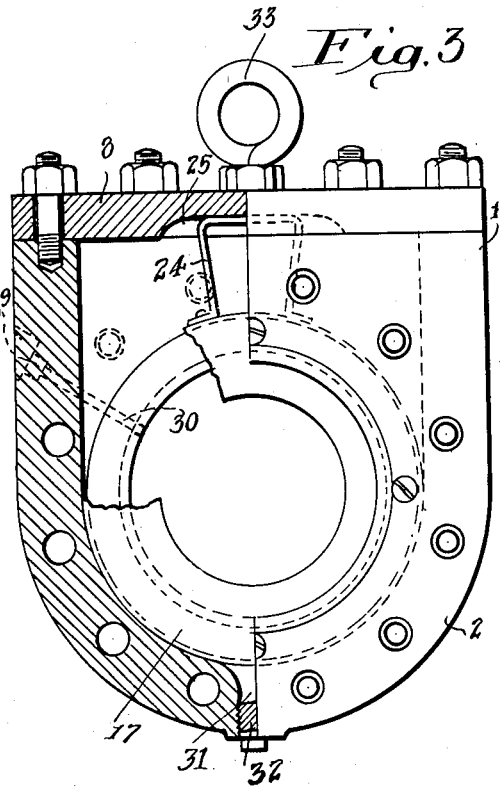
Figure 3 is a view partly in section at about the location of the line 2—2 but looking in the opposite direction, and particularly illustrating the orifice meter disk, and the remainder of the view shows the housing in side elevation.
Figure 4:
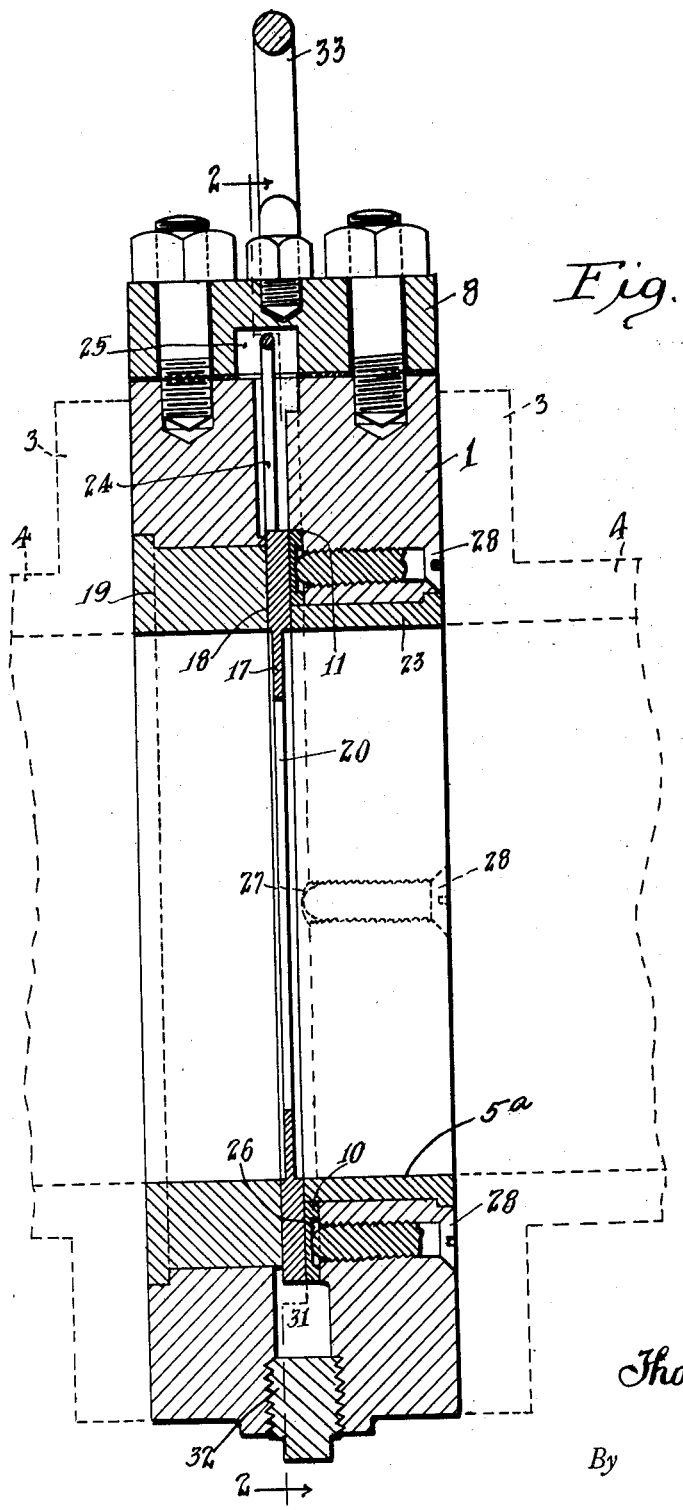
Figure 4 is a vertical section taken substantially on the line 4—4 of Figure 2. This view is upon an enlarged scale.

In order to give the ring 10 a slight rotation on the axis of the opening through the housing, which coincides with the axis of the relatively smaller opening 20 formed in the meter disk, I provide the ring 10 with an outwardly projecting lug 21 in which is mounted a set screw 22, the end of which seats against the shoulder 16. The width of the slot 9 from the bottom of the recess 11 (see Fig. 4) to the fixed seat 18 is greater than the thickness of the pressure ring 10, and this enables the ring to be slipped down through the slot and centered in position and then moved laterally into the recess 11, into which it fits. If desired, the housing on this side may be provided with a bushing 23 which fits into the inner diameter of the ring 10. After the ring 10 has been put in place, the disk 17 may be lowered in the slot 9 into position and should fit neatly in the space between the seat 18 and the ring. In order to facilitate putting the disk in position, I prefer to provide it with a wire handle 24 (see Fig. 3) which extends upwardly, as shown in Fig. 3, and may be received in a recess 25 formed on the undersurface of the cover 8.

In order to enable a rotation or swing of the ring through a small angle, to clamp the disk 17 against the seat 18, I provide cam-means associated with the ring and located on the side of the ring remote from the fixed seat 18. For this purpose, I prefer to provide this face of the ring with a plurality of sockets 26 (see Fig. 4) having bottom faces 27 which are curved so as to give the effect of a cam, and the body 1 is provided with means such as set screws 28 corresponding to each of these sockets. The nose of each set screw is rounded, as shown, and fits into the corresponding cam socket. When the lug 21 is substantially against the shoulder 16, the axes of the set screws 28 should coincide substantially with the middle points of sockets, and in this position there should be sufficient clearance between the ring 10 and seat 18 to permit the disk to be set in place. After the disk is in place, the set screw 22 should be tightened up, thereby causing a slight rotation of the ring 10 in a clockwise direction, as in Figure 2. This will cause the cam faces 27 to ride up on the rounded noses of the set screws 28 and will clamp the thick edge of the disc 17 firmly against the seat 18.

One of the side faces of the housing 1 is provided with threaded sockets 29 connecting with drilled passages 30 that extend down and communicate at their inner ends with the bore through the housing. In other words, one of these openings is at one side of the disk and the other on the other side so as to enable a flow to be developed through a meter, said flow being, of course, developed by the difference in pressure in the housing at the sides of the disk.

At the underside of the housing, I prefer to provide a drain opening 31, which may be closed by removable plug 32.

In a large size meter housing, the cover 8 may be provided with an eye bolt 33 to facilitate lifting it off the housing.

Figure 1:
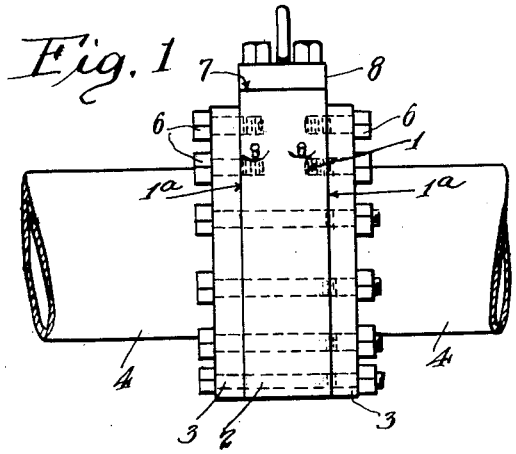
Figure 1 is a side elevation of the orifice meter disk housing construction and illustrating a portion of the pipe line in which the same is placed, the ends of the pipe being broken away.

The bolts 6 are not studs set in the body 1, but are machine bolts. These bolts pass through the flanges 3, as indicated in Figure 1, and are received in the body. The bolts that are not in line with the chamber in the housing are through-bolts, as indicated, while the other bolts are machine bolts that are threaded into tapped holes in the side faces 1ª of the body.

This block form of housing reduces the length of the housing to such an extent that the weight of this housing is only a fraction of the weight of housings as ordinarily constructed.

It is understood that the embodiment of the invention described herein is only one of the many embodiments this invention may take, and I do not wish to be limited in the practice of the invention, nor in the claims, to the particular embodiment set forth.

What I claim is:

1. In an orifice meter disk housing construction, the combination of a housing having an opening therethrough and having side faces for bolting the same between adjacent pipe flanges, said housing having a chamber within the same, an orifice disk received within said chamber, said housing having a fixed seat on one side of the disk, a pressure ring on the other side of said disk, means for adjustably rotating the pressure ring through a small angle on the axis of the opening through the housing, said ring having cam faces formed thereon on the side remote from the disk, and members carried by the housing engaging said cam faces and cooperating with the same when the ring is rotated to press the disk against the fixed seat.

2. In an orifice meter disk housing construction, the combination of a housing having an opening therethrough and having side faces for bolting the same between adjacent pipe flanges, said housing having a chamber within the same, an orifice disk received within said chamber, said housing having a fixed seat on one side of the disk, a pressure ring on the other side of said disk, means for rotating the pressure ring on the axis of the opening through the housing, said pressure ring having a plurality of sockets with cam faces formed in the side thereof remote from the disk, a plurality of set screws corresponding respectively to the sockets and mounted in the said housing so as to engage the cam faces of said sockets and cooperating with the pressure ring, when rotated, to clamp the disk against the fixed seat.

3. In an orifice meter disk housing construction, the combination of a housing having an opening therethrough and having side faces for bolting the same between adjacent pipe flanges, said housing having a chamber within the same, an orifice disk received within said chamber, said housing having a fixed seat on one side of the disk, a pressure ring on the other side of said disk, means for adjustably rotating the pressure ring through a small angle on the axis of the opening through the housing, cam means associated with the ring and located on the side thereof remote from the fixed seat, the said rotation of the pressure ring operating to effect the clamping of the disk against the fixed seat.

4. In an orifice meter disk housing construction, the combination of a housing having an opening therethrough and having side faces for bolting the same between adjacent pipe flanges, said housing having a chamber within the same, an orifice disk received within said chamber, said housing having a fixed seat on one side of the disk, a pressure ring on the other side of said disk, means for supporting the pressure ring centered on the axis of the opening through the housing, said housing having a shoulder projecting into said chamber and an adjusting screw supported on said ring and engaging said shoulder to effect a slight rotation of the said ring on the axis of the housing, and cam-means associated with the ring on the side thereof remote from the fixed seat to force the ring against the disk and clamp the disk against the fixed seat.

5. In an orifice meter disk housing construction, the combination of a housing having an opening therethrough and having side faces for bolting the same between adjacent pipe flanges, said housing having a chamber within the same in the form of a slot opening out through the wall of the housing, a pressure ring mounted in said slot for limited rotation about the axis of the housing, an orifice disk received within said slot, said housing having a fixed seat on the side of said disk remote from the ring, means located in the slot for effecting a slight rotation of the ring, and cam-means associated with the ring on the side thereof remote from the fixed seat to clamp the disk against the fixed seat when the ring is rotated.

6. In an orifice meter disk housing construction, the combination of a housing having a chamber within the same, and a cover over said chamber, an orifice disk received within said chamber, said housing having a fixed seat on one side of the disk, a pressure ring on the other side of said disk, having means located in said chamber under said cover, for rotating the pressure ring through a small angle, said pressure ring having a plurality of contact points disposed around the periphery of the same, and relatively fixed means cooperating with said contact points when the pressure ring is rotated through an angle to press the disk against the fixed seat.

THOMAS N. KELLETT.